Jan. 16, 1940.  W. I. JONES  2,187,322

DOUBLE FASTENER MEMBER

Filed Jan. 15, 1938

Inventor:
Walter I. Jones

Patented Jan. 16, 1940

2,187,322

UNITED STATES PATENT OFFICE 2,187,322

DOUBLE FASTENER MEMBER

Walter I. Jones, Belmont, Mass., assignor to United-Carr Fastener Corporation, Cambridge, Mass., a corporation of Massachusetts Application January 15, 1938, Serial No. 185,163

3 Claims. (Cl. 24—73)

This invention relates to improvements in snap fastener members for securing together two apertured parts, such as a molding, to a support.

In the drawing, which illustrates a preferred embodiment of my invention:—

Figure 1:
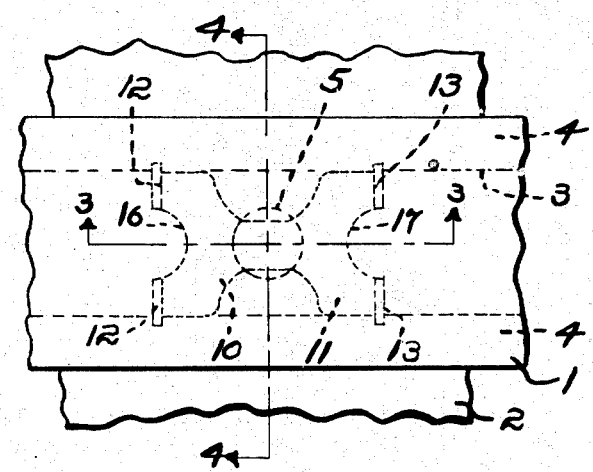
Figure 1 is a front view of my fastener installation showing an apertured part, such as a molding strip, secured to a supporting structure by means of my improved fastener member shown in dotted lines.

My invention, as illustrated in the accompanying drawing, relates to a double-headed fastener member particularly, though not exclusively, adapted to be used in fastener secured installations in which a part such as a hollow molding and the like is quickly and efficiently secured to a supporting structure such as an automobile body. The particular installation shown in the drawing which I have chosen to illustrate the use of my improved fastener member comprises a part such as a molding strip 1 of the type now frequently used on the bodies of automobiles and elsewhere and another part such as a relatively thin supporting plate 2. It should be understood, however, that my improved fastener members may be satisfactorily used for attaching other parts together than those specifically illustrated in the drawing. The molding strip 1, in my preferred form, has an aperture 3 running longitudinally of one of its sides and inwardly-bent flanges 4—4 provided adjacent the aperture 3. The supporting structure 2, which is preferably of thin metal material, is provided with an aperture 5 which may be of circular shape to receive stud means of my fastener member.

Figure 2:
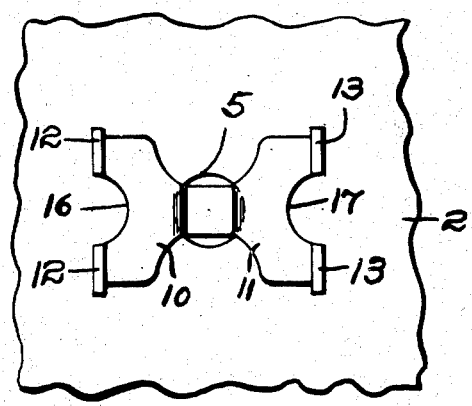
Fig. 2 is a view similar to Fig. 1 but omitting the molding strip.
Figure 3:
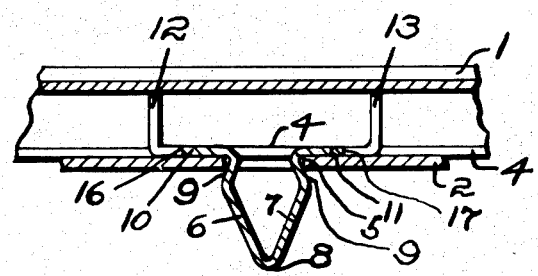
Fig. 3 is a section taken along the line 3—3 of Fig. 1.
Figure 5:
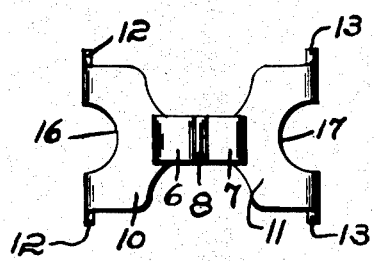
Fig. 5 is a rear view of my fastener member per se.
Figure 6:
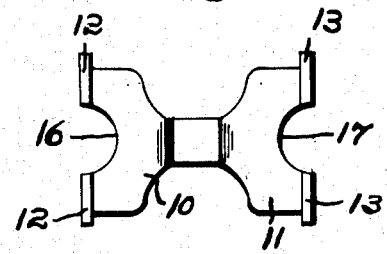
Fig. 6 is a front view of my fastener member per se.
Figure 7:
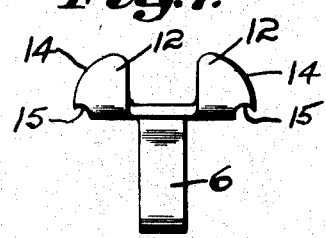
Fig. 7 is an end view of my fastener member per se.
Figure 8:
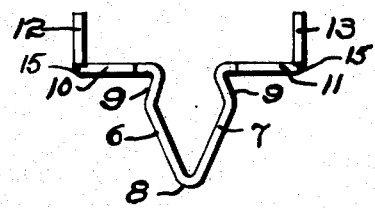
Fig. 8 is a side view of my fastener member per se.

Referring to my preferred form of fastener member, I have provided one having a pair of legs 6 and 7 which are connected together at their outermost ends 8. The legs 6 and 7 diverge from their connected ends 8 and then converge toward their free ends providing shoulders 9—9 for co-operating snap fastener engagement with material adjacent the aperture 5 of the supporting structure. At the free end of the leg 6 I have provided an integral outwardly-extending portion 10 which is preferably of greater width than the leg 6. At the free end of the leg 7 I have provided an integral outwardly-extending portion 11 which extends in an opposite direction to the portion 10. The outwardly-extending portions 10 and 11 are disposed in substantially the same plane, as most clearly shown in Figs. 3 and 8, and form the base of the fastener member. Integral with an edge of the outwardly-extending portions 10 at an end thereof opposed to the end joined to the leg 6 I have provided a pair of spaced attaching portions 12—12 and a similar pair of attaching portions 13—13 is provided at an edge of the outwardly-extending portion 11 at an end thereof opposed to the end integral with the leg 7. The pairs of attaching portions 12—12 and 13—13 extend from the respective outwardly-extending portions 10 and 11 in substantially perpendicular relation thereto and the broad surfaces of the attaching portions of the respective pairs are disposed in opposed substantially parallel relation, as most clearly shown in Figs. 1, 2 and 6. Each of the attaching portions of the respective pairs 12—12 and 13—13 has an outer edge 14 which is inclined, in my preferred form, from adjacent the free end of the attaching portion toward its end adjacent the respective outwardly-extending portion providing a camming surface, as will be understood by those skilled in the art. A notch is cut into the inclined edge 14 of each of the attaching portions adjacent its point of junction with the respective outwardly-extending portion forming a shoulder 15 for engagement with the flanges 4—4 of the molding strip 1 through the aperture 3 thereof. In order to impart a certain degree of yieldability to the respective pairs of attaching portions 12—12 and 13—13 to aid fastener engagement of the same with the molding strip 1, I have provided an opening 16 in the edge of the outwardly-extending portion 10 from which the attaching portions 12—12 extend and between the attaching portions and an opening 17 in the edge of the outwardly-extending portion 11 from which the pair of attaching portions 13—13 extend and between the last-mentioned pair of attaching portions (Figs. 3, 5 and 6).

Figure 4:
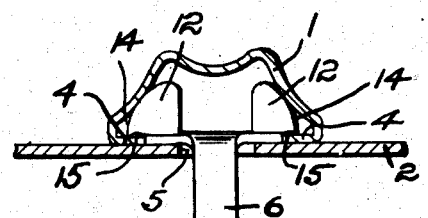
Fig. 4 is a section taken along the line 4—4 of Fig. 1.

Assembly of the component parts of the installation is easily accomplished by preferably first snapping the legs 6 and 7 of the fastener member through the aperture 5 of the supporting structure 2. After this action has been carried out, the outwardly-extending portions 10 and 11 engage an opposite surface of the support 2 from that engaged by the shoulders 9—9 of the legs 6 and 7 and the shoulders 15 of the attaching portions are spaced from the supporting structure 2. In assembling the molding 1 with the fastener member, the inwardly-extending flanges 4—4 are moved into engagement with the camming edges 14 of the attaching portions and downward pressure is exerted upon the top of the molding so as to force the flanges over the attaching portions into final position behind the shoulders 15, as most clearly shown in Fig. 4. This fastener action is accomplished through reason of the resiliency imparted to the portions 10 and 11 by the openings 16 and 17 which enable material of the outwardly-extending portions 10 and 11 adjacent respective attaching portions 12—12 and 13—13 to give slightly in a torsional action as the flanges 4—4 of the molding are moved over the camming edges 14 of the respective attaching portions thereby enabling the flanges to be passed entirely over the camming edges. Furthermore, the flanges 4—4 of the molding 1 may yield slightly as a result of engagement with the camming edges 14 of the attaching portions to aid movement thereof over the camming edges into final position behind the shoulders 15. Although I have shown only one fastener member, it is understood that as many fastener members may be provided as are necessary for securing the molding 1 to the supporting structure 2.

Thus by my invention I have provided a double-headed fastener member which is of simple construction and adapted to efficiently carry out the aforementioned purposes.

Although I have illustrated and described a preferred embodiment of my invention, I do not wish to be limited thereby because the scope of my invention is best defined by the following claims.

I claim:

1. A double snap fastener member for securing moldings and the like to a supporting panel, said fastener member having a base and a pair of yieldable leg portions extending beneath said base, said legs having shoulder means for snap fastener engagement with said supporting panel through an aperture thereof, a pair of attaching portions at each of the opposite ends of said base, said attaching portions of each pair being yieldable toward and away from each other and having shoulders facing substantially in the direction of said leg portions for snap fastener engagement with said molding through an opening thereof, and means for spacing said shoulders from said supporting panel when said fastener member is secured thereto whereby said fastener member may be secured first to said panel and said molding thereafter snapped into engagement with said fastener member.

2. A double snap fastener member for securing moldings and the like to a supporting panel, said fastener comprising a pair of yieldable leg portions connected at one end, said legs having shoulder means for snap fastener engagement with said supporting panel through an aperture thereof, outwardly-extending portions at the ends of said legs opposed to said connected ends, said outwardly-extending portions extending in opposite directions forming a base adapted to engage a surface of said supporting panel, and a pair of attaching portions extending from each of said outwardly-extending portions, said attaching portions of each of said pairs being yieldable toward and away from each other and having shoulders facing substantially in the direction of said leg portions for snap fastener engagement with said molding through an opening thereof, and means for spacing said shoulders from said supporting panel when said fastener member is secured thereto whereby said fastener member may be secured first to said panel and said molding thereafter snapped into engagement with said fastener member.

3. A double snap fastener member for securing moldings and the like to a supporting panel, said fastener comprising a pair of yieldable leg portions connected at one end, said legs having shoulder means for snap fastener engagement with said supporting panel through an aperture thereof, outwardly-extending portions at the ends of said legs opposed to said connected ends, said outwardly-extending portions extending in opposite directions and disposed in substantially the same plane forming a base adapted to engage a surface of said supporting panel, a pair of opposed attaching portions integral with each of said outwardly-extending portions and extending in angular relation to the plane of said base, each of said outwardly-extending portions having an opening between the respective pair of attaching portions extending therefrom rendering the attaching portions of each of said pairs movable toward and away from each other, and said attaching portions having shoulders for snap fastener engagement with said molding through an opening thereof, and means for spacing said shoulders from said supporting panel when said fastener member is secured thereto whereby said fastener member may be secured first to said panel and said molding thereafter snapped into engagement with said fastener member.

WALTER I. JONES.